United States Patent Office 2,801,980
Patented Aug. 6, 1957

2,801,980

ANTIOXIDANT FOR RUBBER

Ronald B. Spacht, Kent, Ohio, assignor, by mesne assignments, to The Goodyear Tire & Rubber Company, a corporation of Ohio No Drawing. Application April 17, 1953, Serial No. 349,538

4 Claims. (Cl. 260—4)

This invention relates to age resisters or antioxidants for rubber and is particularly concerned with the use in rubber of resinous allyl phenols.

In the practice of this invention, rubber is treated with new resinous compositions which are obtained by polymerizing, in the presence of a polymerization catalyst, a phenolic compound having an allyl side chain. More particularly, the invention contemplates the use of allyl phenolic compounds, including substituted allyl phenolic compounds.

The allyl phenolic compounds from which the useful products of the invention are prepared can be represented by the following structural formula:

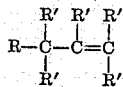

wherein R is an aromatic radical having at least one hydroxyl group directly attached thereto and R' is hydrogen or an aliphatic radical.

More specifically, the products of this invention can be defined as the resinous homopolymerization products of an allyl phenol conforming to the following structure:

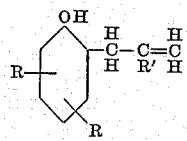

wherein R is selected from the group consisting of hydrogen and aliphatic alkyl hydrocarbon radicals having from one to four carbon atoms, wherein R' is selected from the group consisting of hydrogen and a methyl radical and wherein the polymers contain at least two but not more than ten monomer units.

The aromatic compound and the allyl compound should, of course, be free from additional reactive substituents which would result in competing or complicating reactions. A greater degree of reaction is possible because the allyl radical has unsaturation between the second and third carbon atoms from the ring. In the practice of the invention, it is preferable to have a cresyl radical connected to a hydrocarbon radical which has unsaturation between the second and third carbons from the ring.

Examples of suitable allyl phenolic compounds are:

2-allyl phenol
6-allyl,2-methyl phenol
2-allyl,3-methyl phenol
6-allyl,3-methyl phenol
2-allyl,4-methyl phenol
2-allyl,4-ethyl phenol
2-allyl,3,5-dimethyl phenol
6-allyl,2,5-dimethyl phenol
2-allyl,3,4-dimethyl phenol
6-allyl,3,4-dimethyl phenol
2-allyl,1-naphthol
1-allyl,2-naphthol
2-allyl,4-isopropyl phenol
6-allyl,2-isopropyl phenol
2-allyl,3-isopropyl phenol
6-allyl,3-isopropyl phenol
2-allyl,4-tertiary butyl phenol
2-allyl,4-tertiary octyl phenol
2-allyl,4-tertiary amyl phenol
2-allyl,4-tertiary nonyl phenol
2-allyl,4-alphaphenylethyl phenol
6-allyl,2-alphaphenylethyl phenol
2-allyl,4-methyl-6-tertiary butyl phenol
2-allyl,3-methyl-6-tertiary butyl phenol
6-allyl,2-methyl-4-tertiary butyl phenol
3-allyl,1,2-dihydroxy phenol
2-allyl,1,3-dihydroxy phenol
2-allyl,1,4-dihydroxy phenol
2-allyl,3-methyl-6-isopropyl phenol
6-allyl,2,4-dimethyl phenol In addition to the above, the corresponding methallyl compounds are useful embodiments of the invention. Also, any of the above compounds can have substitution on any of the carbons of the allyl radical if the substitution is of such a nature as not to interfere with the basic polymerization reaction.

The allyl phenolic compounds may be prepared in any convenient manner. A phenolic compound can be reacted with an allyl compound to produce an allyl phenolic compound. This reaction is generally accompanied by the splitting out of a simple molecule. Because a hydrogen halide is desirable for polymerization of a allyl phenolic composition, it is preferred that the allyl reactant have a halogen atom beta to the double bond so that a hydrogen halide is split off when the reaction takes place. For example, the following structural equation:

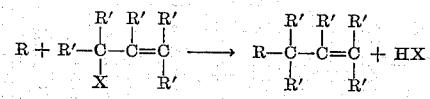

wherein R is an aromatic compound having at least one hydroxyl group directly attached to a ring, R' is hydrogen or an aliphatic radical and X is a halogen, shows the condensation reaction. Because a hydrogen halide is thus provided by the reaction, the addition of certain metal halide polymerization catalysts completes the preferred polymerization system.

The resinous products of the invention are prepared by polymerizing the allyl phenolic compounds. In order to provide a resin which is easily soluble in rubber, it is preferable to keep the average length of the polymer chains at least 2 and not over 10 monomer units.

Low molecular weight polymers can be provided by regulating the conditions of reaction. For example, superior products result if the reaction temperature is kept below 125° C. and the reaction allowed to continue for several hours. The time and temperature are of course largely determined by the reactants being used and the composition desired.

The preparation of the compounds of the invention is illustrated by the following example.

EXAMPLE 1

Seventy grams of 2-allyl-4-methyl phenol and 1 gram of zinc chloride were heated to 100° C. Thereafter, anhydrous HCl was bubbled through the mixture. After about 5 minutes, a rapid reaction took place and the temperature rose to 200° C. The reaction product was heated to 210° C. at 30 mm. pressure to remove volatile materials. This reaction produced 58.5 grams of resin.

If desired, the polymerization may proceed from the ether form of the phenolic composition. Although it is not completely ascertained, it is believed that the ether form may revert to the allyl phenolic form prior to polymerization. The ether polymerization reaction can be illustrated by the following structural equation:

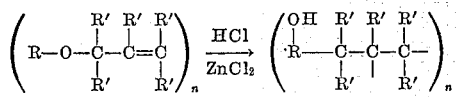

wherein R is an aromatic radical and R' is hydrogen or an aliphatic radical. When the ether form of the polymerization reactant is used, it is preferable to add hydrogen halide as well as a customary polymerization catalyst. The following example further illustrates the preparation of the compounds of this invention.

EXAMPLE 2

Sixty-six grams of allyl-p-tolyl ether were heated to 100° C. Dry HCl was then bubbled through the ether. After about one hour, during which time no apparent reaction had occurred, one gram of zinc chloride was added. The temperature rose immediately to 180° C. The resulting reaction product was heated to 210° C. at 30 mm. of pressure in order to effect removal of volatile materials. Thirty-eight and five-tenths grams of resin were obtained.

In a preferred process, mixed cresols are reacted with allyl chloride (in equimolecular proportions) to provide the polymerization reactant, allyl cresol. Generally, an excess of cresol is used in order to provide a solvent for the allyl chloride. Other solvents can be used to keep the system in solution. Examples of such solvents are benzene, toluene, xylenes, ethyl benzene, etc., or any inert hydrocarbon which may be removed by heating under vacuo. This reaction provides by-product hydrogen chloride, which serves as an element of the polymerization system. The addition of a catalytic amount of zinc chloride completes the preferred polymerization system.

This process is illustrated by the following example.

EXAMPLE 3

Two hundred sixteen grams of o-cresol were placed in a flask along with 1.0 gram of zinc chloride. Seventy-six and five-tenths grams of allyl chloride were added slowly to the mixture as it was being heated. The polymerization system was then refluxed at a temperature of about 80–125° C. for 3 hours. Excess o-cresol was removed by heating to 150–200° C. at 25 mm. of pressure. This reaction produced an 88% yield of resin calculated on the weight of o-cresol actually used.

Although the preferred phenolic composition is a mixture of cresols, it is readily apparent that the individual cresols, phenol, and such double ring monohydric compounds as the naphthols are suitable for the practice of the invention.

It is essential that the phenolic compound have at least one ortho or para position to the OH open on the ring. It is preferable that two positions be open, either both ortho positions or an ortho and a para position because this arrangement provides for faster reaction.

The invention is further illustrated by the following examples.

EXAMPLE 4

One hundred sixty-two grams of ortho-cresol and 1.5 grams of zinc chloride were heated to 80° C. and then 120 grams of allyl chloride were added slowly. This system was refluxed at about 80–125° C. for 3 hours. The resultant product was distilled under vacuum to remove excess cresol. A 98% yield of resin, based on the cresol used, was thus obtained.

EXAMPLE 5

Two hundred twenty grams of resorcinol were heated at 120° C. with 1 gram of anhydrous zinc chloride. Thereafter, 80 grams of allyl chloride were slowly added during a period of one and a half hours. This polymerization system was heated at a temperature of about 125° C. for about one hour or until all HCl was evolved from the reaction between the resorcinol and the allyl chloride. Thereafter, the excess resorcinol was removed by distillation under a vacuum. A quantitative yield of resin was obtained.

EXAMPLE 6

One hundred forty-four grams of β-naphthol and 1 gram of zinc chloride were heated to just above the melting point of the β-naphthol. Thereafter, 76.5 grams of allyl chloride were slowly added during a period of two hours. This system was heated for another one and a half hours at 150° C. The excess β-naphthol was then removed by vacuum distillation. A 74% yield of resin was obtained.

The efficacy of the products of this invention as antioxidants or age resistors for natural and synthetic rubbers and rubber-like materials is illustrated by the following described tests.

Various products of the invention were compounded in the following formula.

| | |
|---|---:|
| Extracted pale crepe | 100 |
| Zinc oxide | 5 |
| Sulphur | 3 |
| Hexamethylene tetramine | 1 |
| Stearic acid | 1.5 |
| Antioxidant | 1 |

Test samples were vulcanized and tested, giving the results indicated in Table I.

Representative antioxidants were prepared by reacting allyl chloride with the indicated phenols in equimolecular amounts and polymerizing the reaction product in the presence of HCl which was generated during the reaction and in the presence of zinc chloride which was added, both HCl and ZnCl₂ being present in catalytic amounts. The following table summarizes the results:

*Table I*

Cure—50 minutes at 285° F. Aging data—O₂ bomb.

| Phenol Used | Percent Tensile Retention—Days Exposure | | | Percent Gain in Wt.—Days Exposure | | |
|---|---|---|---|---|---|---|
| | 6 | 12 | 18 | 6 | 12 | 18 |
| No Antioxidant (control) | 0.0 | 0.0 | 0.0 | 15.02 | 16.96 | 17.30 |
| antioxidant A [1] | 58.9 | 37.2 | 12.5 | 0.42 | 0.79 | 1.18 |
| mixed cresols | 95.2 | 85.1 | 73.0 | 0.15 | 0.30 | 0.40 |
| meta-cresol | 80.9 | 69.0 | 54.4 | 0.35 | 0.56 | 0.87 |
| para-cresol | 94.2 | 92.4 | 75.3 | 0.18 | 0.30 | 0.71 |
| ortho-cresol | 101.9 | 90.2 | 84.0 | 0.09 | 0.29 | 0.42 |
| p-tertiary butyl phenol | 61.2 | 56.1 | 28.1 | 0.86 | 0.83 | 2.02 |
| m, p-isopropyl phenol | 70.4 | 43.2 | 27.6 | 0.57 | 1.07 | 1.75 |
| α-phenylethyl-p-cresol | 67 | 26 | 25.2 | 0.72 | 1.33 | 1.57 |
| α-phenylethyl-o-cresol | 57 | 17.5 | 14.9 | 0.79 | 1.27 | 1.64 |
| α-phenylethyl-m-cresol | 39.8 | 13.1 | 13.6 | 1.35 | 2.57 | 3.58 |
| p-α-phenylethyl phenol | 63.8 | 27.8 | 15.7 | 0.85 | 1.70 | 2.47 |
| o-α-phenylethyl phenol | 48.5 | 24.0 | 20.0 | 0.83 | 1.61 | 2.45 |
| p-tertiary amyl phenol | 60.3 | 17.7 | 12.6 | 0.95 | 1.95 | 2.80 |
| tertiary butyl-p-cresol | 73.4 | 33.3 | 25.3 | 0.57 | 1.39 | 1.75 |

[1] A commercial nonstaining antioxidant comprising a mixture of alkylated phenols.

These results show that the product of this invention are effective antioxidants and that the cresol derivatives are particularly effective in preventing the aging of rubber.

Further tests were conducted to establish that the products of the invention are nonstaining and nondiscoloring. Representative products of the invention were compounded in a white rubber formula containing natural rubber, sulfur, zinc oxide, calcium carbonate, stearic acid, and antioxidant in the relationship of 1 part antioxidant to 100 parts natural rubber. These samples, plus two samples containing commercial antioxidants and one sample with no antioxidant, were exposed in a weatherometer for 48 hours. The following table summarizes the results by a comparison rating wherein 1 represents no detectable discoloration and 10 represents severe discoloration.

Table II

| Resin used: | Rating |
|---|---|
| Control—no antioxidant | 2 |
| Antioxidant A [1] | 7 |
| Antioxidant B [2] | 5 |
| Mixed allyl cresol resin | 3 |
| Allyl p-cresol resin | 3 |
| Allyl o-cresol resin | 6 |

[1] A commercial nonstaining antioxidant comprising a mixture of alkylated diphenyl amines.
[2] A commercial nonstaining antioxidant comprising a mixture of alkylated bis phenols.

These results show that the products of the invention are good non-staining antioxidants.

The products of the invention are useful as age resisters in both vulcanized and raw rubber and both uses are contemplated within the scope of the specification and claims.

Use of "a rubber" is intended to include natural rubber and the various synthetic rubbers and rubber-like materials which are similar from the standpoint of aging, e. g. polychloroprene, the polymerization products of a major proportion of a mono-olefin, such as isobutylene, and a minor proportion of a poly-olefin, such as butadiene or isoprene, the rubbery copolymers of butadiene and styrene, and the rubbery copolymers of butadiene and acrylonitrile, and the like.

The term "phenolic compounds" is used herein to include any aromatic compound which contains at least one hydroxyl group directly attached to the aromatic nucleus and which does not contain reactive groups. Representative examples are phenol, the cresols, the xylenols, the ethyl phenols, the propyl phenols, the chloro-phenols, the nitro-phenols, the thymols, the carvacrols, monoalpha-phenylethyl phenol, dialpha-phenylethyl phenol, octyl phenol, tertiary butyl phenol, and multiple ring compounds such as the naphthols.

Although this invention has been described with particular reference to pure phenolic compounds, mixtures of the various phenolic materials are contemplated within the scope of the invention as indicated by the structural formulae. For example, a rubber may be treated with at least one or more than one of the pure resinous polymerization products of an allyl phenol or it may be treated with the resinous polymerization products of a mixture of allyl phenols.

Any allyl phenolic compound is within the scope of the invention, the primary allyl compounds forming a preferred class.

While certain representative embodiments and details have been shown for the purpose of illustrating the invention, it will be apparent to those skilled in this art that various changes and modifications may be made therein without departing from the spirit or scope of the invention.

I claim:

1. An oxidizable rubbery polymer of a conjugated diene selected from the group consisting of natural rubber, polychloroprene, the copolymers of isobutylene with isoprene, the copolymers of butadiene with styrene and the copolymers of butadiene with acrylonitrile, containing as an antioxidant in an antioxidant amount one of the resinous homopolymerization products of an allyl phenol conforming to the following structure

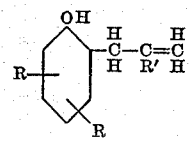

wherein R is selected from the group consisting of hydrogen and aliphatic alkyl hydrocarbon radicals having from one to four carbon atoms, wherein R' is selected from the group consisting of hydrogen and a methyl radical and wherein the polymers contain at least two but not more than ten monomer units.

2. The product according to claim 1 wherein the antioxidant is one of the resinous homopolymerization products of ortho allyl phenol.

3. The product according to claim 1 wherein the antioxidant is one of the resinous homopolymerization products of mono tertiary butyl ortho allyl phenol.

4. The product according to claim 1 wherein the antioxidant is one of the resinous homopolymerization products of mono tertiary butyl ortho allyl cresol.

References Cited in the file of this patent

UNITED STATES PATENTS

| 1,940,727 | Moss et al. | Dec. 26, 1933 |
| 2,223,550 | Harvey | Dec. 3, 1940 |
| 2,296,363 | Messer | Sept. 22, 1942 |
| 2,409,277 | Harvey | Oct. 15, 1946 |
| 2,460,255 | Harvey | Jan. 25, 1949 |

OTHER REFERENCES

Romburgh et al.: Chemical Abstracts, volume 11, 3258–9 (1917).